United States Patent [19] [11] 3,978,238
Frey et al. [45] Aug. 31, 1976

[54] METHODS OF WARMING FOOD BETWEEN MOVEABLE SPRING BIASED HEATER MEANS

[76] Inventors: Irwin K. Frey, P.O. Box 4836, Fairview Park, Ohio 44126; Charles L. Zola, 24619 Royalton Road, Columbia Station, Ohio 44028

[22] Filed: July 14, 1975

[21] Appl. No.: 595,796

Related U.S. Application Data

[60] Continuation of Ser. No. 321,462, Jan. 5, 1973, abandoned, which is a division of Ser. No. 273,013, July 18, 1972, Pat. No. 3,746,837.

[52] U.S. Cl. .............................. 426/523; 99/332; 99/380; 99/392
[51] Int. Cl.² ........................................ A23C 3/00
[58] Field of Search .............. 426/520, 523; 99/327, 99/331, 332, 335, 373, 376–380, 389–392; 219/386, 387, 403, 404, 439, 444, 447, 456, 521, 523, 524, 525

[56] References Cited
UNITED STATES PATENTS

| | | | |
|---|---|---|---|
| 1,915,962 | 6/1933 | Vaughn | 219/525 |
| 2,246,317 | 6/1941 | Parr | 99/372 |
| 2,272,658 | 2/1942 | Challet | 219/456 |
| 2,588,908 | 3/1952 | Crane | 99/327 |
| 2,881,299 | 4/1959 | Jepson | 219/524 |
| 3,281,577 | 10/1966 | Altemiller | 219/524 |
| 3,348,470 | 10/1967 | Swanson | 99/331 |
| 3,696,734 | 10/1972 | Beasley | 99/331 |

Primary Examiner—Norman Yudkoff
Assistant Examiner—Martin G. Mullen
Attorney, Agent, or Firm—Watts, Hoffmann, Fisher & Heinke Co.

[57] ABSTRACT

A food warming appliance having base and cover structures defining a portable case. A pair of opposed heating panels are mounted, one in each of the structures, and biased toward each other so as to firmly engage food positioned therebetween when the structures are closed. Foods and food trays of a wide variety of sizes, shapes and thicknesses can be positioned between the panels and firmly gripped so as to be warmed through a gentle conductive heat transfer. The heating compartment is well insulated and has the capability of serving as a cold food storage area to keep frozen foods frozen for substantial periods of time. A safety electrical interlock system normally de-energizes the heating panels when the appliance is open. An interlock by-pass plug and cord permit open case operation where the appliance is to be used to keep foods warm during serving.

6 Claims, 14 Drawing Figures

METHODS OF WARMING FOOD BETWEEN MOVEABLE SPRING BIASED HEATER MEANS

This is a continuation of application Ser. No. 321,462 filed Jan. 5, 1973 and now abandoned, as a division of Ser. No. 273,013 filed July 18, 1972, now U.S. Pat. No. 3,746,837.

A supporting rack structure is provided for receiving and energizing a plurality of such appliances. Selection switches permit selection of one of several predetermined food serving times. Methods of warming foods for consumption by an individual or large numbers of people through use of such appliances and supporting rack structures are described.

BACKGROUND OF THE INVENTION

1. Field of the Invention

The present invention relates generally to a portable food warming appliance and methods employing such appliances for heating foods for consumption by an individual or large numbers of people.

2. Prior Art

Many proposals have been made for incorporating food warming devices into portable containers, such as lunch boxes and the like, for transport together with prepared food and such utensils as are required to serve and consume the food. Proposals have also been made in an effort to provide portable lunch kits specially adapted to receive, transport, and heat frozen food trays. One such proposal is set forth in U.S. Pat. No. 3,385,952, issued May 28, 1968 to E. W. Mix.

A significant disadvantage of known portable food warming devices is the inefficiency with which they heat food. Portable food warmers to date have principally relied on the heating techniques of convection and radiation to warm the food. Typically one or more heating devices is disposed in spaced relationship with the food to be warmed. While a number of proposed food warmers dispose the heating element within a chamber which also holds the food to be warmed, most dispose the heating element outside the chamber. In either arrangement, the resulting system is in essence a small oven providing a heating compartment which is substantially larger than the food positioned therein for warming. Very little use has been made in known portable food warmers of the more efficient heating technique of conduction as opposed to radiation and convection.

Radiation and convection heating techniques are not only less efficient and consequently more costly than is conduction heating, but they further necessitate the heating of one or more heating elements to a temperature which is higher than that needed for conduction heating. To express this problem in another way, radiation and convection techniques require more time to transfer a given quantum of heat to the food than does conduction heating, assuming the heating elements in both situations are at the same temperature. Accordingly, in order to warm the food within a reasonable period of time by radiation and convection techniques, the heating element temperature is ordinarily elevated considerably above the temperature to which the food is to be heated.

High temperature heating element operation, in and of itself, creates several problems. First, the food warmer components must be constructed to withstand the high heating element temperatures. This often necessitates the use of special heat resistant materials thereby increasing the cost of the food warmer. Second, where high heating element temperatures are involved, substantial amounts of heat insulating materials must be provided to keep the exterior portions of the food warmer case cool.

Still other problems due to high heating element temperatures are encountered with respect to the warming function of the apparatus in that the foods being warmed often tend to scorch and dry out. The food portions nearest the heating element tend to reach temperatures above the temperature to which the food is to be warmed while interior portions of the foods are still below the desired temperature. Consequently, depending on the type of food being warmed, various adverse surface effects are encountered. The surfaces of some foods tend to "cook" rather than to "warm." This changes the character of the food being warmed in an undesirable fashion. The surfaces of other foods tend to dry out so as to become undesirably crusty. Other foods tend to scorch or burn giving them a very unpalatable appearance and flavor.

Most known food warming devices cannot be used to keep food warm and ready to serve for a prolonged period of time without adversely affecting the food. This disadvantage is particularly annoying where the operator has energized the food warmer in anticipation of consuming the food at a predetermined future time, and is then delayed unexpectedly whereupon the food becomes overheated and cooks, scorches, dries out, burns or otherwise loses its appetizing appeal. It is not uncommon that the food is rendered entirely inedible where it is left in the heated apparatus substantially longer than anticipated.

There are many industries where large shifts of employees are given brief lunch breaks that begin and end at set periods. While it is desirable to provide each employee with a warm lunch, significant problems and expenses are encountered in maintaining and operating cafeterias of sufficient size to accommodate large numbers of employees in short time intervals. Moreover, a number of employees find they can bring food from home on a daily basis at a lesser cost than is involved in cafeteria dining. Still other employees are faced with special dietary requirements that cannot be provided for in the cafeteria menu.

In other industries, for instance construction work, there are no cafeterias or other facilities where the employee can readily purchase a warm lunch. In these employments, it is common for the workers to carry their lunches daily from home. If the employee wants part or all of his lunch warm at his lunch break, the usual approach is to pre-heat the food at home and pack it in insulated containers. While the insulated containers have been remarkably improved in recent years, the fact remains that they do nothing in and of themselves to further heat the food, and the food accordingly gradually cools off. Moreover, many foods deteriorate if kept at elevated temperatures for several consecutive hours. Accordingly, the types of foods which can be kept warm are substantially limited in number.

Accordingly, while it is recognized as being desirable to provide employees with facilities which will enable them to daily enjoy a warm lunch including food of their choice at a minimum of expense to the employee, the fact remains that there is no way to provide cafeteria-style facilities for employees in many industries, and where cafeterias are provided they still do not serve the needs of some employees.

While many portable lunch kits with self contained heating units and control timers have been proposed as a possible solution to the workman's need for a warm lunch, the fact remains that the proposed lunch kits have had too many problems associated therewith to gain any substantial acceptance.

SUMMARY OF THE INVENTION

The present invention overcomes the foregoing drawbacks of prior art food warming devices and provides novel and improved methods and apparatus for heating foods and providing heated foods for consumption by one or even a large number of people.

In accordance with the present invention, food to be warmed is conductively heated by means of a pair of opposed heating panels which firmly engage opposite sides of the food. Such an arrangemment is to be distinguished from an oven-type heating appliance which disposes the food in a compartment of significantly greater size than the food to be heated with the heating element in spaced relationship to the food, and then heats or warms the food principally by radiation and/or convection.

Whereas radiation and convection heating techniques tend to result in an overheating of the food surfaces most directly exposed thereto, the conduction heating system of the present invention does not have this effect. The heating elements reach a temperature which is not appreciably above the temperature to which the food is to be warmed. Accordingly, the food surfaces in contact with the heating elements are not heated to unduly high temperatures, and the food is heated gently.

It has been found that the conductive heating arrangement of the present invention serves to direct the heat from the heating elements into the food so as to minimize heat transfer to other portions of the apparatus. Moreover, the arrangement of the present invention results in a delivery of maximum heat to the coldest areas of the food so as to warm the food substantially uniformly. These are important advantages which deserve further explanation.

Heat tends to radiate uniformly in all directions from a heating element. Accordingly, in radiation/convection heating devices, a substantial amount of heat is transferred to the appliance itself thereby requiring a substantial amount of insulation and requiring the use of materials which will withstand high temperatures. The portion of the radiated heat which is delivered to the food tends to heat the surface of the food relatively quickly to relatively high temperatures before the heat can be dissipated in the food by conduction.

The present invention not only minimizes heat loss to the appliance structure which surrounds and mounts the heating elements, but also overcomes the problem of temperature build-up on the food surfaces so as to effect a delivery of maximum heat to the coldest areas of the food. The transfer of heat by conduction results in the largest heat flow between areas of greatest temperature differential. Accordingly, (1) where the food is colder than the surrounding portions of the appliance which mount the heater elements, the maximum heat flow will be directed into the food and not into other portions of the appliance; and (2) since the food is in intimate contact with the heating elements, conductive heat transfer will proceed at a maximum rate between the hottest regions of the heating elements and the coldest regions of the food. By this arrangement, the food surfaces do not become overheated while the regions inwardly of the food remain frozen. Rather, the food tends to warm in a substantially uniform fashion.

In an apparatus constructed in accordance with the present invention, the food is securely engaged or clamped on two opposite sides of relatively large cross-sectional areas. Accordingly, a large heat input area is utilized in transferring heat from the heating elements to the food. Since a large heat input area is utilized, a small heat input per square inch will result in a large total heat input. Moreover, the heating compartment is essentially confined to the size of the food being heated such that minimal radiation and convection heat losses are incurred. These several features combine to give a very gentle and highly efficient heating action.

The efficiency of operation of the present invention cannot be over emphasized. By virtue of the direct conductive heating arrangement, only about 300–400 watts power input are required to warm a typical food serving. A frozen dinner can be thawed and warmed in approximately 20–30 minutes, which is at least comparable to, if not less than, the time needed to perform the same function in the 240 volt oven of an ordinary kitchen range. The 300–400 watt input requirement of the present apparatus is even substantially less than that of the ordinary household coffee pot which typically consumes about 1000 watts at the start of its operation. Accordingly, the cost of operating the apparatus of the present invention is quite low.

The low energy input requirement renders the apparatus of the present invention much more nearly usable in automotive and boat applications than prior art food warming systems. Particularly where longer food warming times are tolerable, the energy requirement of the heaters can be considerably reduced so as to render possible operation from boat and automotive ignition systems.

Still another feature of the low power input requirement is improved operator safety. The various components of the apparatus are heated to relatively low temperatures and are so insulated that the likelihood of occasioning burns is very small.

Turning now more specifically to other structural features of the apparatus, the mounting of the heating panels is of particular interest. In the preferred embodiment both the upper and the lower panels are mounted in a "floating" fashion and biased toward each other. Among the advantages of this arrangement are:

1. The apparatus is not limited to use with food containers of any particular size or configuration. The apparatus will not only accommodate food containers of a wide range of thicknesses, but also a wide range of sizes and shapes.
2. Regardless of the shape or size of the food container placed between the heating panels, it will be held firmly in place so as to not bounce about or open accidentally.
3. The apparatus is not limited to use with pre-formed food containers. Food which is not wrapped at all or simply wrapped in metallic foil can be warmed.

The "floating" mounting of the heating panels is provided by disposing each panel within a pan and interposing compression coil springs between each heating panel and its surrounding pan so as to bias the heating panels toward the rims of the pans. Stops are provided adjacent the pan rims to limit the travel of the heating panels.

By arranging the stops in the form of projections which engage the heating panels along two opposite edges, the heating panels can be removed simply by depressing one edge so as to cock the panel in its pan thereby permitting the opposite edge to be elevated out of the pan past its stop projections. Accordingly, should any liquid seep into the regions of the pans behind the heating panels, the panels can be removed to facilitate cleaning.

Silicone rubber sealing rings are positioned around the rims of the pans so that when the base and cover of the appliance are closed, the sealing rings engage each other to prevent liquid seepage into other areas of the appliance. Sealing rings are also interposed between the edges of the heating panels and the interior walls of the pans to prevent liquid seepage into the regions behind the heating panels. Moreover, the sealing rings additionally serve to insulate the heater panels from the pans, and the pans from their supporting structure.

The food heating compartment is well insulated from the outer case both by the provision of insulating materials therebetween and by virtue of the mounting of the heating panels so as to establish a poor heat conducting path to adjacent components. This insulated feature not only increases the efficiency of operation of the appliance during heating, but also gives the appliance a cold storage capability that enables it to keep frozen dinners frozen for substantial periods of time prior to the initiation of the heating cycle.

An electrical interlock safety feature is provided which will ordinarily serve to de-energize both heating panels once the base and cover are opened. Where it is desired to use the heating panels in open-case operation to keep dishes of food warm during serving, two means are provided for overcoming the operation of the interlock. Where only one heating panel is needed for open-case operation, a plug is provided which can be inserted into the interlock component of the base to permit operation of the base-carried heating panel. Where both heating panels are required for open-case operation, an interlock by-pass cord is provided to electrically interconnect the interlock components of the base and cover.

The apparatus of the present invention can be used to warm a wide variety of foods. While it is well suited for use in thawing and heating trays of frozen food, it is not limited to use with frozen food. A particularly delicious meal can be prepared by warming a pre-cooked steak and mushrooms wrapped together in aluminum foil. The low gentle heat can be used to cook delicate fish or to heat hot dogs or to melt cheese or chocolate. Sandwiches can be warmed without being wrapped if desired. Many other uses will be apparent.

In order to permit large scale use of such appliances by factory workers, construction workers and other working people, a rack structure is provided which will receive and energize a plurality of food warming appliances. A separate compartment is provided for each food warming appliance. At the rear of each compartment is an electrical plug which will register with an appliance carried plug when the appliance is pushed fully inwardly of a compartment. A separate selector switch is provided to selectively connect the appliance to one of a plurality of master timers. By this arrangement, a workman can select one of several times when his lunch is to be ready.

Such rack structures can be located in convenient areas of industrial plants or can be made in the form of mobile units for use at construction sites. If the rack structures are to be positioned in a dusty environment, the compartments can be provided with separate windowed doors. Moreover, individual keyed locks can be incorporated in the doors in the fashion of baggage lockers so that each workman can secure his food warming appliance and have no fear that it will be unplugged or the selected serving time changed.

In view of the foregoing summary, it should be apparent that the food warming appliance of the present invention is a highly versatile device capable of warming most foods so that they taste better than foods warmed in oven-type enclosures, capable of highly efficient, low-cost operation, and adapted for individual home use, boat and automotive use, and particularly to large scale use in industrial plants, at construction sites and the like.

Accordingly, it is a general object of the present invention to provide a novel and improved conductive heating portable food warming appliance.

It is another object to provide such an appliance which is adapted to receive and warm foods and food trays of a wide variety of shapes, sizes and thicknesses.

It is still another object to provide a means and method employing such appliances for warming foods for consumption by large numbers of people.

Other objects and a fuller understanding of the invention may be had by referring to the following description and claims taken in conjunction with the accompanying drawings.

DESCRIPTION OF THE PREFERRED EMBODIMENT

Figures 1, 2, 3:
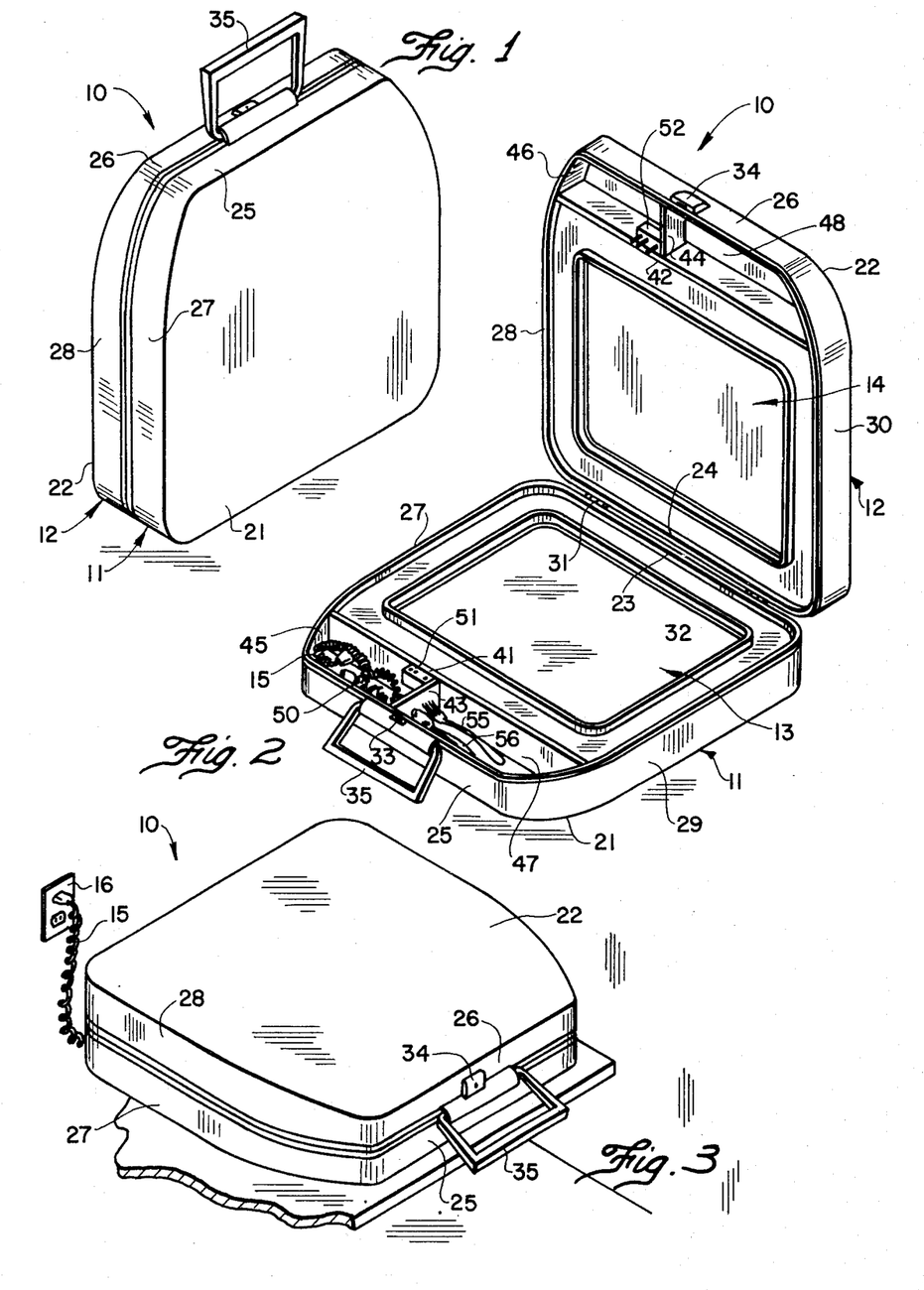
FIG. 1 is a perspective view of the food warmer of the present invention with the case closed and in an upright position for transport.
FIG. 2 is a perspective view of the food warmer with the case open to illustrate the interior construction.
FIG. 3 is a perspective view of the food warmer with the case closed and positioned in the horizontal operational position and with power for heating being supplied through an auxiliary power cord.

Referring to FIGS. 1-3, a portable electric food warming appliance constructed in accordance with one aspect of the present invention is shown generally at 10. A mating base 11 and cover 12 cooperate to define a portable housing or case within which the heating components of the food warmer 10 are mounted for transport and operation. Opposed electrically energized heating panels 13, 14 are mounted within the base 11 and cover 12 in a "floating" fashion as will be described in greater detail.

With the base 11 and cover 12 open as shown in FIG. 2, food to be warmed such as a sandwich wrapped in aluminum foil or a tray of frozen food, is positioned on the heating panel 13. The cover 12 is then closed so as to clamp the food between the heating panels 13, 14. Since the base 11 and cover 12 are well insulated, as will be explained, the food will be kept at approximately its original temperature for periods of reasonable length such as 4–5 hours. During this time, the appliance 10 can be uprighted to the position of FIG. 1 for transport. The food warming operation is carried out with the appliance in the generally horizontal position of FIG. 3. As shown in FIG. 3, an auxiliary power cord 15 is provided for energizing the appliance 10 by means of a standard wall-mounted electrical outlet 16. By virtue of the fact that the food to be warmed is clamped between the heating panels 13, 14, the warming of the food is carried out primarily through the direct heating technique of conduction as opposed to the techniques of radiation and convection. This heating arrangement is advantageous in many respects, several of which will be described.

The base 11 and cover 12 are molded to define mating pan-like structures including generally planar outer walls 21, 22. Formed integrally with the outer wall 22 of the base 11 are back and front walls 23, 25 and opposed sidewalls 27, 29. Formed integrally with the outer wall 22 of the cover 12 are back and front walls 24, 26 and opposed sidewalls 28, 30.

In a conventional fashion, hinges 31, 32 pivotally interconnect the base 11 and cover 12 along the back walls 23, 24. Cooperating latch lock components 33, 34 of conventional design are mounted on the front walls 25, 26 to releasably hold the base 11 and cover 12 in closed configuration. A carrying handle 35 is pivotally mounted on the base 11 to facilitate transporting the appliance.

The interior of the appliance case is partitioned into separate heating and utility compartments. Partitions 41, 42 and 43, 44 divide the base 11 and cover 12 into mating utility compartments 45, 46 and 47, 48. The remaining interior regions of the base 11 and cover 12 house the heating panels 13, 14 as will be described.

The mating utility compartments 45, 46 are provided for housing the power supply cord 15 and an interlock by-pass cord 50 which will be described. A pair of cooperating female and male electrical interlock components 51, 52 are mounted within the compartments 45, 46. As will also be described, the interlock components 51, 52 serve to prevent energization of the heating panels 13, 14 when the base 11 and cover 12 are opened. The interlock by-pass cord 50 is designed to overcome the operation of the interlock components 51, 52 during special circumstances where it is desirable to energize the heating panels 13, 14 with the base 11 and cover 12 open.

The mating utility compartments 47, 48 are provided for housing such utensils as are required to serve and consume the food warmed by the appliance 10. By way of illustration, a fork 55 and spoon 56 are shown positioned in the compartment 47.

Figure 4:
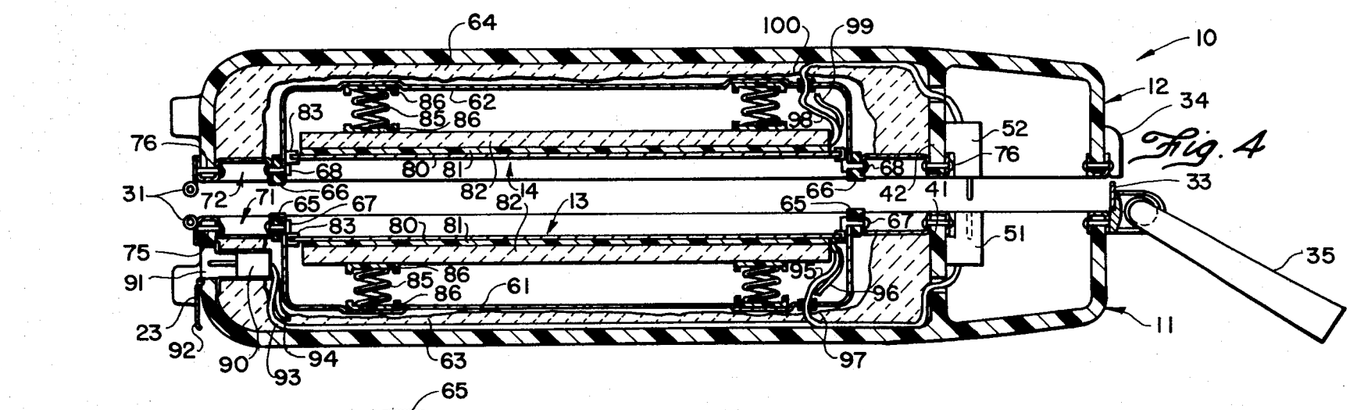
FIG. 4 is an enlarged sectional elevational view of the food warmer in closed position, the base and cover structures being spaced apart in the drawing to more clearly illustrate the details of construction.
Figure 5:
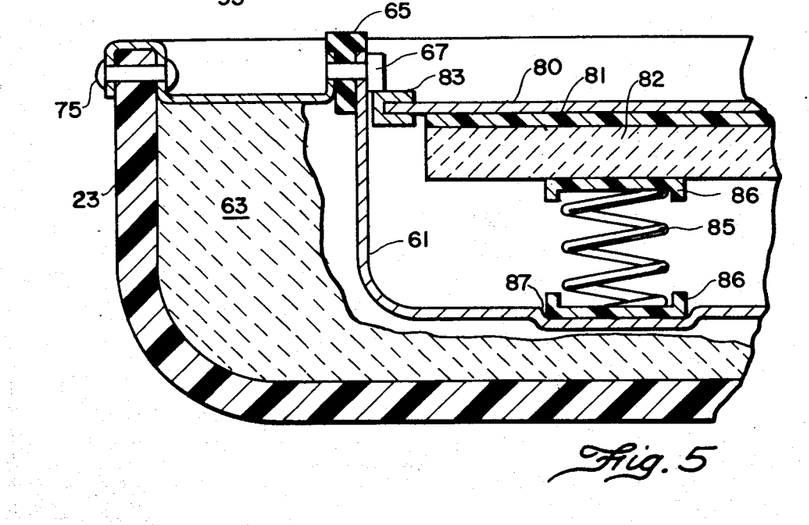
FIG. 5 is a sectional elevational view on an even more enlarged scale of a portion of the food warmer particularly illustrating the mounting of the heating panels.

Referring to FIGS. 4 and 5, a pair of metallic pans 61, 62 are positioned interiorly of and in spaced relationship to the base 11 and cover 12. The pans 61, 62 define a pair of mating recesses within which the heating panels 13, 14 are mounted. As will be explained in greater detail, the heating panels 13, 14 are biased toward each other so as to clamp the food to be heated therebetween. The heating panels 13, 14 are also removable in order to clean the pans 61, 62.

The pans 61, 62 are mounted in an insulated fashion in the base 11 and cover 12. The region between the pan 61 and the base 11 is filled with a fiberglass insulation layer 63. The regions between the pan 62 and the cover 12 is similarly filled with a fiberglass insulation layer 64. Disposed around the rims of the pans 61, 62 are silicone rubber strips 65, 66 which insulate the pans 61, 62 from supporting frame structures 71, 72.

In addition to insulating the pans 61, 62 from the frame structures 71, 72 the silicone rubber strips 65, 66 serve the secondary function of providing a peripheral seal around the pans 61, 62 which prevents the seepage of liquids from the region of the pans through other portions of the appliance. The silicone rubber strips 65, 66 are clamped by means of rivets 67, 68 between the frame structures 71, 72 and the pans 61, 62. This prevents the seepage of liquids between the pans 61, 62 and the frame structures 71, 72. Moreover, the strips 65, 66 extend above the rim of the pan 61 and below the rim of the pan 62 so as to be clamped together when the base 11 and cover 12 are closed. This prevents the seepage of liquids between the strips 65, 66 when the appliance is closed.

The frame structures 71, 72 include trough-like deck members 73, 74 which surround the rims of the pans 61, 62 and bridge the space between the pans 61, 62 and the base 11 and cover 12. Rivets 75, 76 rigidly secure the deck members 73, 74 to the base 11 and cover 12. The rivets 67, 68 extend through the silicone rubber strips 65, 66 and serve to support the pans 61, 62 rigidly from the deck members 73, 74.

The heating panels 13, 14 each comprise a flat bonded assembly of a thin aluminum facing plate 80, a heating element 81, and an insulating sheet 82 of asbestos laminate. The heating elements 81 are preferably silicon rubber laminated electrical resistance heating devices of the type sold under the trademark WATLOW by the Ogden Company of St. Louis, Missouri. These heating elements 81 are available with a thermostat hermetically sealed therein so that the temperature of the heating elements 81 can be pre-set and accurately regulated. Preferably the heating elements 81 include such a thermostat which is pre-set for a temperature limit of approximately 200°F.

The aluminum facing plates 80 of the heating panels 13, 14 extend beyond the edges of the heating elements 81. Silicon rubber sealing rings 83 are peripherally supported on the facing plates 80. The sealing rings 83 serve to insulate the facing plates 80 from the pans 61, 62 while simultaneously providing a seal therebetween which prevents liquid seepage into the regions beneath the heating panel 13 and above the heating panel 14.

A significant feature of the present invention resides in the provision of a "floating" mounting for the heating panels 13, 14. Referring to FIG. 5, interposed between the panels 13, 14 and the pans 61, 62 are a plurality of compression coil springs 85. The ends of the springs have silicon rubber feet 86 compressed thereover so as to be held firmly on the springs 85. The feet 86 provide a resilient cushion between the springs 85 and the panels 13, 14 and pans 61, 62 which assists in holding the springs in place and deading any noise which would otherwise result during relative movement of these members. Moreover, the feet 86 serve as insulators to prevent conductive heat transfer from the panels 13, 14 through the springs 85 to the pans 61, 62. Indentations 87 are provided in the pans 61 62 to facilitate positioning of the springs 85 during assembly.

The springs 85 serve to bias the panels 13, 14 toward each other. The normal upward movement of the lower panel 13, and the downward movement of the upper panel 14 are limited by engagement of the sealing rings 83 with the inner ends of the rivets 67, 68. By this arrangement, the rivets 67, 68 serve the function of stops which hold the heating panels 13, 14 in the base 11 and cover 12 when no food is positioned between the panels 13, 14.

Figure 6:
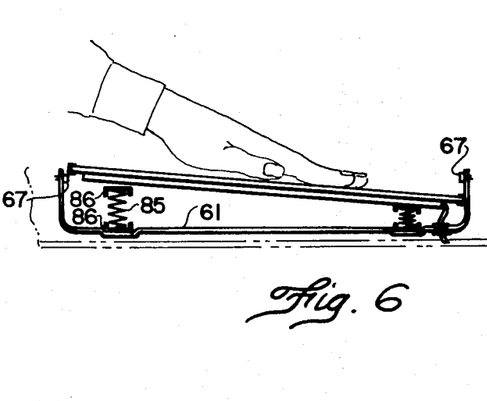
FIG. 6 is a schematic diagram illustrating how the heating panels can be cocked slightly for removal.

The rivets 67, 68 having inwardly projecting ends which serve as stops for the panels 13, 14 are preferably located only along opposite ends of the panels 13, 14. This arrangement enables each of the heating panels to readily be removed simply by depressing one end of the panel and then elevating the other end past the stop rivets 67, 68, as shown in FIG. 6. In the rare instance where liquid has seeped between the sealing rings 83 and the pans 61, 62, such a removable arrangement of the heating panels is desirable to permit cleaning of the pans 61, 62.

The arrangement of electrical connectors and conductors within the base 11 and cover 12 is illustrated in FIG. 4. A male power input plug 90 is mounted interiorally of the base 11 along the back wall 23. An aperture 91 is provided through the back wall 23 to provide access to the plug 90. A pivotally mounted cover 92 selectively opens or closes the aperture 91. The cover 92 is spring loaded in conventional fashion so as to be held selectively in the open or closed position. When the cover 92 is open, the electrical supply cord 15 can be attached to the plug 90, as shown in FIG. 7.

A pair of conductors 93, 94 extend from the male plug 90 beneath the pan 61 to the interlock component 51. A pair of conductors 95, 96 connect with the lower heating element 81 and extend through a gromet 97, positioned in an aperture in the bottom wall of the pan 61, to the interlock component 51. Similarly, a pair of conductors 98, 99 connect with the upper heating element 81 and extend through a gromet 100 to the interlock component 52.

Figures 7, 8, 9, 10, 11:
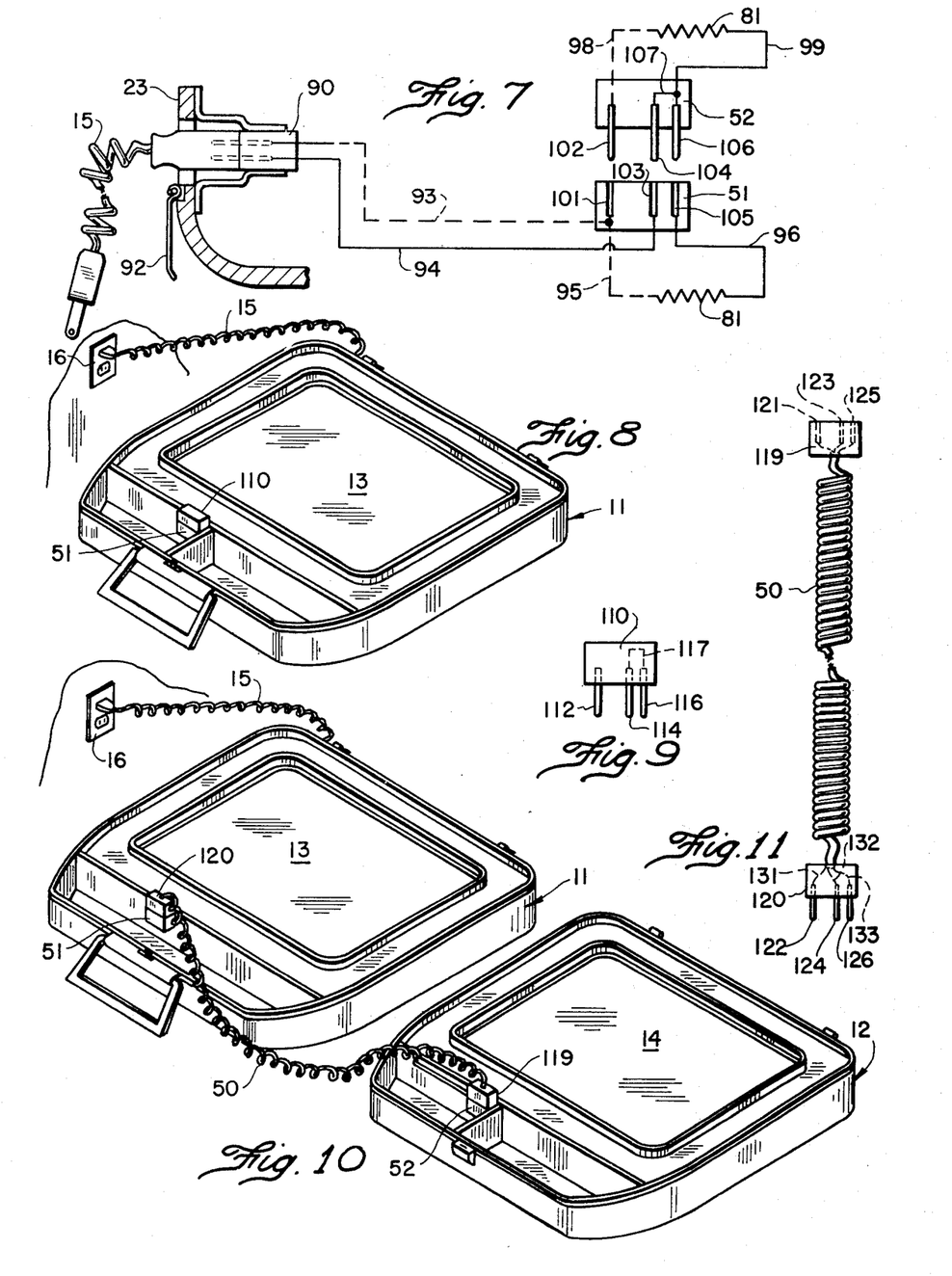
FIG. 7 is a schematic illustration of the electrical circuitry including a safety interlock.
FIG. 8 is a perspective view of the base of the appliance as provided with an interlock over-ride plug for open-case food warming operation.
FIG. 9 is a schematic illustration of the electrical wiring arrangement of the interlock over-ride plug shown in FIG. 8.
FIG. 10 is a perspective view of the appliance with the base and cover structures separated for open-case operation and interconnected by an interlock by-pass cord.
FIG. 11 is a schematic illustration of the electrical wiring arrangement of the interlock by-pass cord shown in FIG. 10.

Referring to FIG. 7, the electrical interlock components 51, 52 have three pairs of mating connectors 101, 102 and 103, 104 and 105, 106 which make connection when the base 11 and cover 12 are closed. The connector pairs 103, 104 and 105, 106 are positioned more closely together than are the connector pairs 101, 102 and 103, 104 to prevent the improper attachment of the interlock by-pass cord 50, as will be described.

Electrical energy is delivered by the conductors 93, 94 from the plug 90 to connectors 101, 103 of the interlock component 51. The conductor 95 also connects with the connector 101 so as to directly connect the conductor 93 to one terminal of the lower heating element 81. In similar fashion, the conductor 98 connects one terminal of the upper heating element 81 to the connector 102.

The connector pairs 103, 104 and 105, 106 must be brought into registry before connection is made between the conductor 94 and either of the heating elements 81. By this arrangement, a safety feature is provided which serves to de-energize the heating panels 81 when the cover 12 is opened. The conductor 94 connects with the connector 103. The conductors 96, 99 connect the connectors 105, 106 to the lower and upper heating elements 81. A conductor 107 electrically interconnects the connectors 104, 106. Accordingly when the base 11 and cover 12 are closed, the connectors 103, 104, 105, 106 are all electrically coupled to the conductor 94 so as to energize the heating elements 81.

While the appliance 10 is primarily intended for operation in closed-care fashion to warm food clamped between the heating panels 13, 14, it is also occasionally desirable to use one or both of the heating panels 13, 14 in open-case fashion to keep dishes of foods warm during serving. Accordingly, two means of overriding the electrical interlock are shown in FIGS. 8–11.

Where only one of the heating panels is required to be used in open-case operation, an interlock over-ride plug 110 is provided for insertion into the connectors 101, 103, 105 of the interlock component 51. As shown in FIG. 9, the plug 110 is provided with connectors 112, 114, 116 which mate respectively with the connectors 101, 103, 105. A conductor 117 electrically interconnects the connectors 114, 116 so as to enable the supply of current through the interlock component 51 to the heating panel 13. The connectors 114, 116 are positioned more closely together than are the connectors 112, 114 so the plug 110 cannot be improperly connected to the interlock component 51.

Where both of the heating panels 13, 14 are needed for use in open-case operation, the interlock over-ride cord 50 is connected between the interlock components 51, 52 as shown in FIG. 10. As illustrated in FIG. 11, the cord 50 is provided with female and male plugs 119, 120 having connectors 121, 122 interconnected by a first conductor 131, connectors 123, 124 interconnected by a second conductor 132, and connectors 125, 126 interconnected by a third conductor 133. The connectors 123, 125 and 124, 126 are positioned more closely together than are the connectors 121, 123 and 122, 124 so that the plugs 119, 120 cannot be improperly connected to the interlock components 51, 52. With the interlock over-ride cord 50 connected between the components 51, 52, both of the heating panels 13, 14 can be energized in open-case operation.

Figure 12:
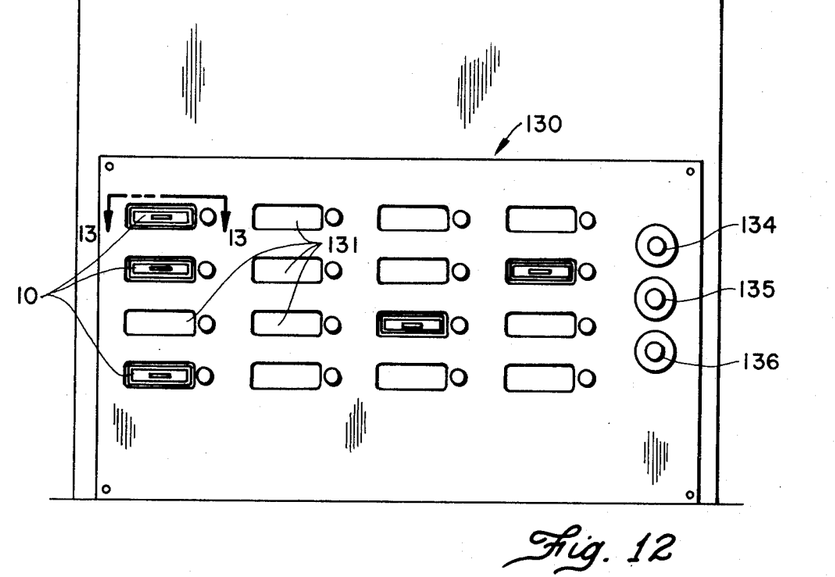
FIG. 12 is a front elevational view of a rack structure for receiving and energizing a plurality of food warming appliances.

Referring to FIG. 12, a rack structure 130 is shown including a plurality of appliance receiving compartments 131. The rack structure 130 not only provides a means for storing a plurality of the food warming appliances 10, but also provides a means for energizing the appliances at one of several pre-selected times. By this arrangement, a workman can insert his own food warming appliance 10 into one of the compartments 131 and then return to a warm lunch at a pre-selected time.

Figure 13:
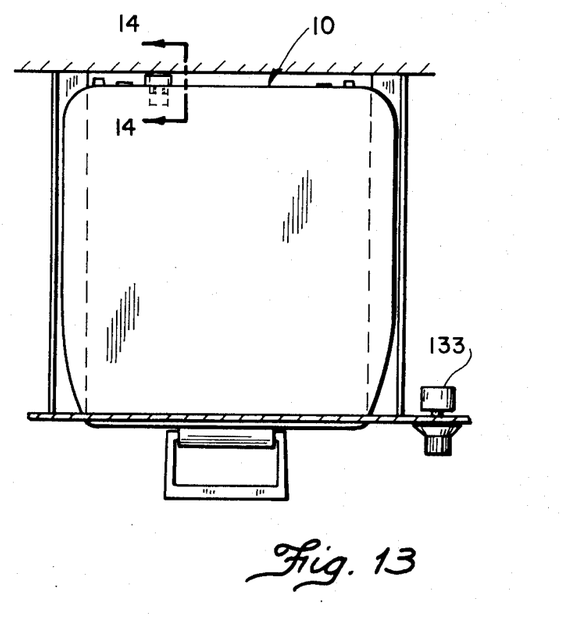
FIG. 13 is an enlarged cross-sectional view as seen from the plane indicated by the line 13—13 in FIG. 12; and, FIG. 14 is a cross-sectional view on an even more greatly enlarged scale of the electrical interconnection between a food warming appliance and the supporting rack, as seen from the plane indicated by the line 14—14 in FIG. 13.
Figure 14:
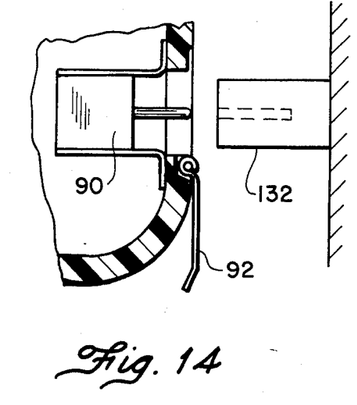

Referring to FIGS. 13 and 14, the compartments 131 are each provided with a female electrical plug 132 positioned so as to align with the appliance-carried plug 90. In operation, the workman opens the closure 92 to expose the plug 90 and then slides the appliance 10 into one of the compartments 131 until the plug 90 is received by the plug 132. This arrangement obviates such safety problems as might otherwise arise where many workmen seek to plug their food warming devices into electrical outlets with power cords draped one over the other, etc.

A separate selector switch 133 is associated with each of the compartments 131 so as to selectively connect the plugs 132 to one of several master-timer switches 134, 135, 136. The timer switches 134, 135, 136 are each programmed to energize the appliance 10 at a different time so as to have the food positioned therein warmed for different pre-selected serving times. By way of example, the selector switch 133 can be used to select a serving time of either 11:30, 12:00 or 12:30.

The rack structure 130 can be provided with windowed doors (not shown) covering each of the compartments 131 where the rack structure is to be positioned in a dusty environment. The doors can further be provided with keyed locks in the manner of a baggage locker so that each employee can insert his food warming appliance and select a serving time with the assurance that the appliance will not be stolen or disconnected, or the serving time changed in his absence.

As should now be apparent from the foregoing description, food to be warmed is positioned between the heater panels 13, 14. The base 11 and cover 12 are then closed so as to bring the heater panels 13, 14 into firm contact with opposite sides of the food. The appliance 10 is then energized either by means of the power cord 15 or by positioning the appliance as described in the rack structure 130. The heating panels are energized so as to attain a temperature not substantially in excess of the temperature to which the food is to be warmed. This heating continues for a period of time sufficient to warm the food to the desired temperature.

Throughout the foregoing description the term "food" has been used broadly to include unwrapped or unpackaged food, wrapped or packaged food, e.g. food wrapped in aluminum foil, and trays or containers of food, e.g. frozen dinners. It will be understood that where the food is wrapped, packaged or containerized, the surrounding packaging material is preferably characterized by a high heat transfer co-efficient and is preferably in intimate contact with the food so as to permit the conductive transfer of heat from the panels 13, 14 to the food.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A method of warming foods through conductive heating, comprising the steps of:
   a. providing a food warming appliance including:
      i. a pair of connected housing portions which are relatively movable toward each other to a closed position and away from each other to an open position;
      ii. a first heater means carried internally of one of said housing portions;
      iii. a second heater means carried internally of the other of said housing portions;
      iv. said housing portions being operable when in said closed position to define a chamber internally of said housing portions;
      v. said housing portions additionally being operable when in said closed position to establish a substantially continuous engagement therebetween perimetrically of such chamber whereby such chamber is closed when said housing portions are in said closed position;
      vi. said first and second heater means being positioned in such chamber and being operable when energized to achieve an operating temperature which is not substantially in excess of 200°F.;
      vii. at least one of said heater means being movable relative to its carrying housing portion such that when said housing portions are in said closed position, said first and second heater means are movable relatively toward and away from each other without causing corresponding relative movement of said housing portions; and
      viii. spring biasing means is operably connected to said at least one heater means and to said at least one heater means and to its carrying housing portion for biasing said at least one heater means relative to its carrying housing portion such that when said housing portions are in said closed position, said at least one heater means is biased toward the other of said heater means;
   b. positioning said housing portions in said open position;
   c. inserting food to be warmed between said first and second heater means;
   d. closing the appliance by moving said housing portions to said closed position to close such chamber with such food positioned therein and to bring said first and second heater means into firm engagement with opposite sides of such food with said first and second heater means being biased relatively toward each other by said spring biasing means and to thereby maintain firm clamping engagement between said heater means and such food so long as said housing portions are retained in said closed position; and,
   e. while said housing portions are retained in said closed position, energizing said first and second heater means to heat such food as is positioned between said heater means to an operating temperature which is not substantially in excess of 200°F. and which is not substantially in excess of the desired temperature to which such food is to be warmed, such energization of said heater means being continued for a period of time sufficient to warm the food to such desired temperature.

2. The method of claim 1 additionally including the steps of connecting said first and second heater means to a timing apparatus, and setting such timing apparatus to supply electrical energy to the heater means to energize said heater means at a predetermined time.

3. The method of claim 1 additionally including the steps of positioning such appliance within a compartment of a support structure subsequent to the closing of the appliance with such food therein, and effecting said energization of said heater means while the appliance is positioned within such compartment.

4. A method of warming foods through conductive heating, comprising the steps of:
 a. providing a food warming appliance including:
  i. a pair of connected housing portions which are relatively movable toward each other to a closed position and away from each other to an open position;
  ii. a first heater means carried internally of one of said housing portions;
  iii. a second heater means carried internally of the other of said housing portions;
  iv. said housing portions being operable when in said closed position to define a chamber internally of said housing portions;
  v. said housing portions additionally being operable when in said closed position to establish a substantially continuous engagement therebetween perimetrically of such chamber whereby such chamber is closed when said housing portions are in said closed position;
  vi. said first and second heater means being positioned in such chamber and being operable when energized to achieve an operating temperature which is not substantially in excess of 200°F;
  vii. each of said heater means being movable relative to its respective carrying housing portion such that when said housing portions are in said closed position, said first and second heater means are movable relatively toward and away from each other without causing corresponding relative movement of said housing portions; and
  viii. first and second spring biasing means operably connected respectively to said first and second heater means and to their respective carrying housing portions for biasing each of said heater means relative to its carrying housing portion such that when said housing portions are in said closed position, said heater means are biased toward each other;
 b. positioning said housing portions in said open position;
 c. inserting food to be warmed between said first and second heater means;
 d. closing the appliance by moving said housing portions to said closed position to close such chamber with such food positioned therein and to bring said first and second heater means into firm engagement with opposite sides of such food with said first and second heater means being biased relatively toward each other by said spring biasing means and to thereby maintain firm clamping engagement between said heater means and such food so long as said housing portions are retained in said closed position; and,
 e. while said housing portions are retained in said closed position, energizing said first and second heater means to heat such food as is positioned between said heater means to an operating temperature which is not substantially in excess of 200°F. and which is not substantially in excess of the desired temperature to which such food is to be warmed, such energization of said heater means being continued for a period of time sufficient to warm the food to such desired temperature.

5. The method of claim 4 additionally including the steps of connecting said first and second heater means to a timing apparatus, and setting such timing apparatus to supply electrical energy to the heater means to energize said heater means at a predetermined time.

6. The method of claim 4 additionally including the steps of positioning such appliance within a compartment of a support structure subsequent to the closing of the appliance with such food therein, and effecting said energization of said heater means while the appliance is positioned within such compartment.

* * * * *